UNITED STATES PATENT OFFICE 2,687,873

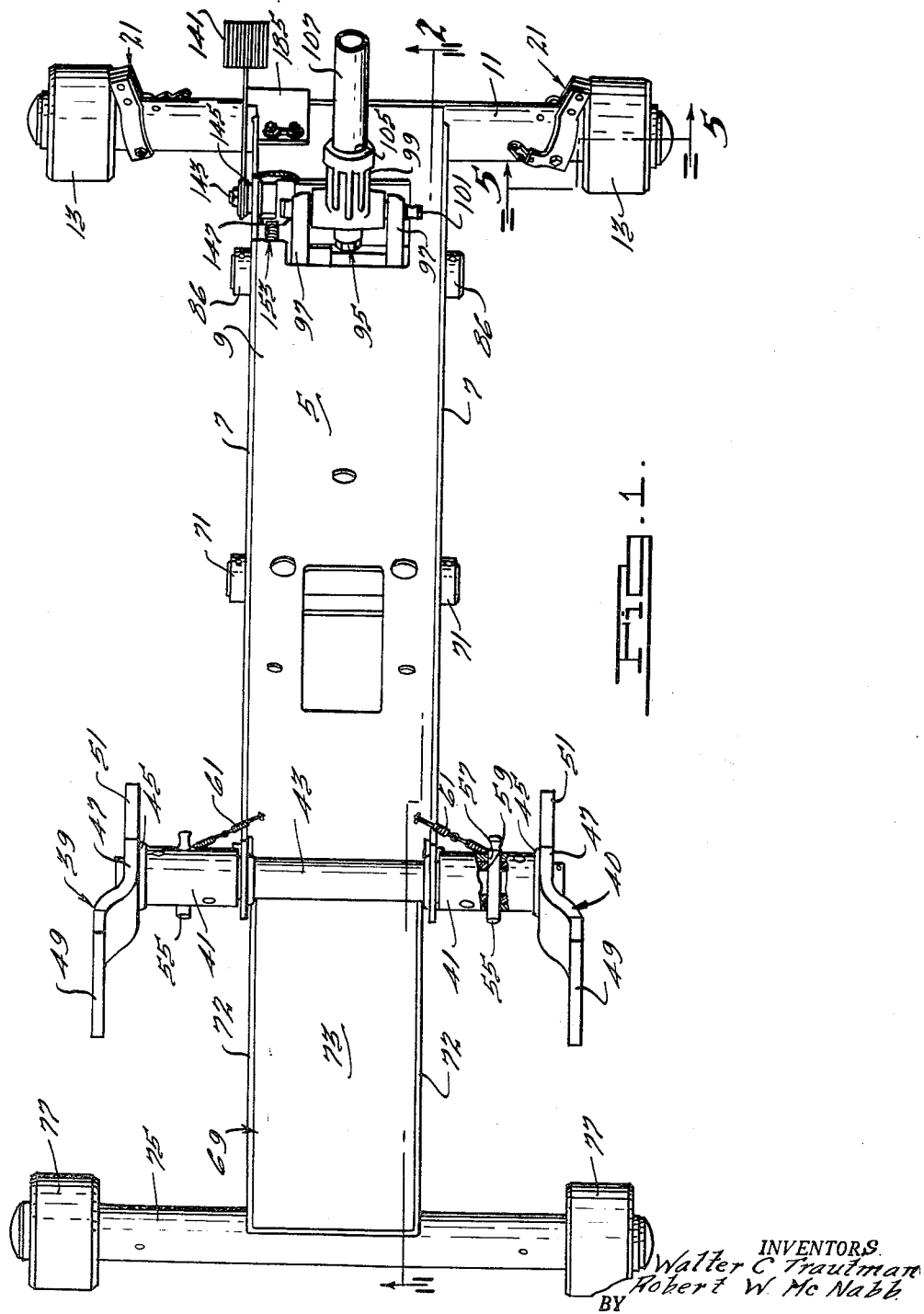

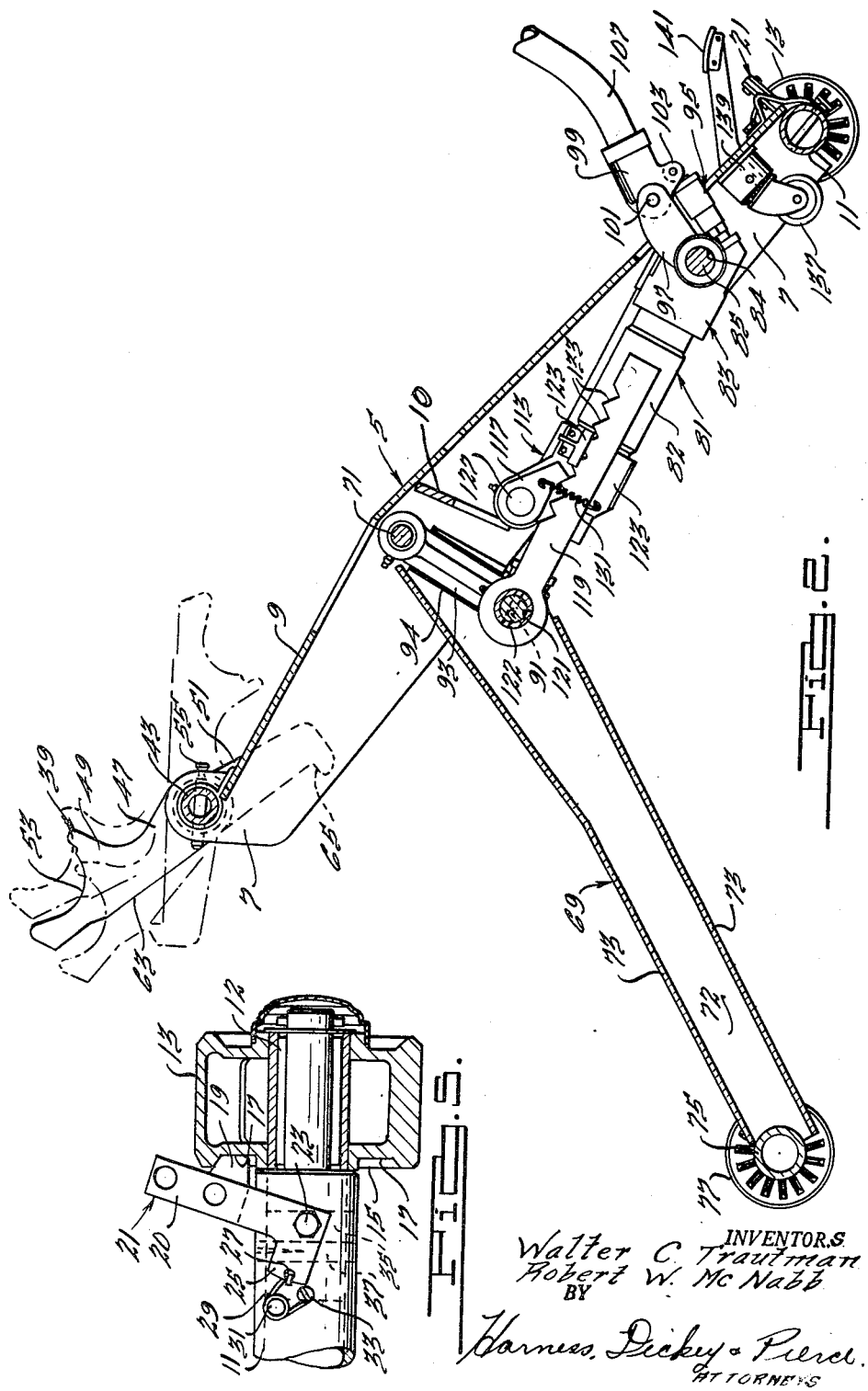

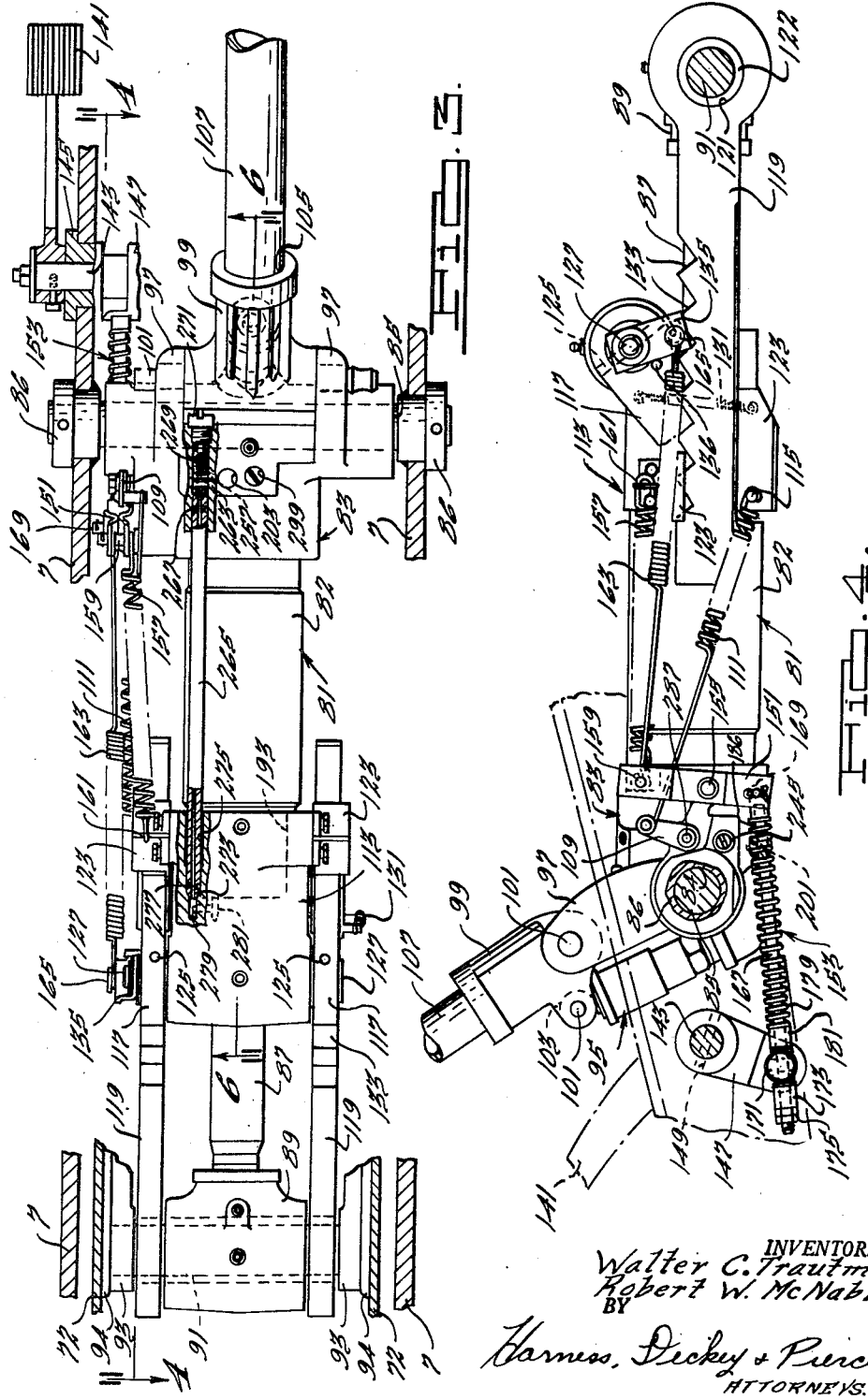

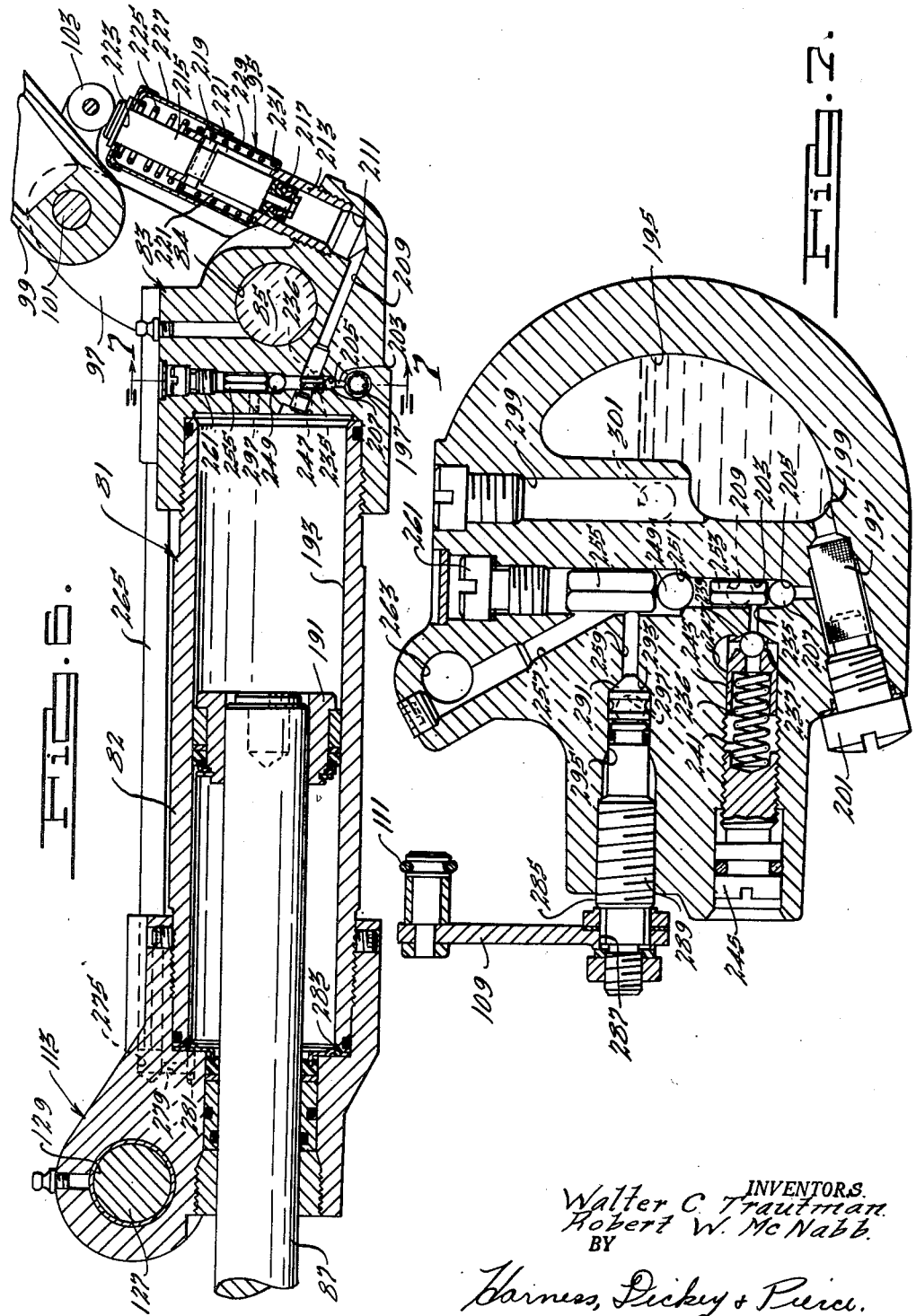

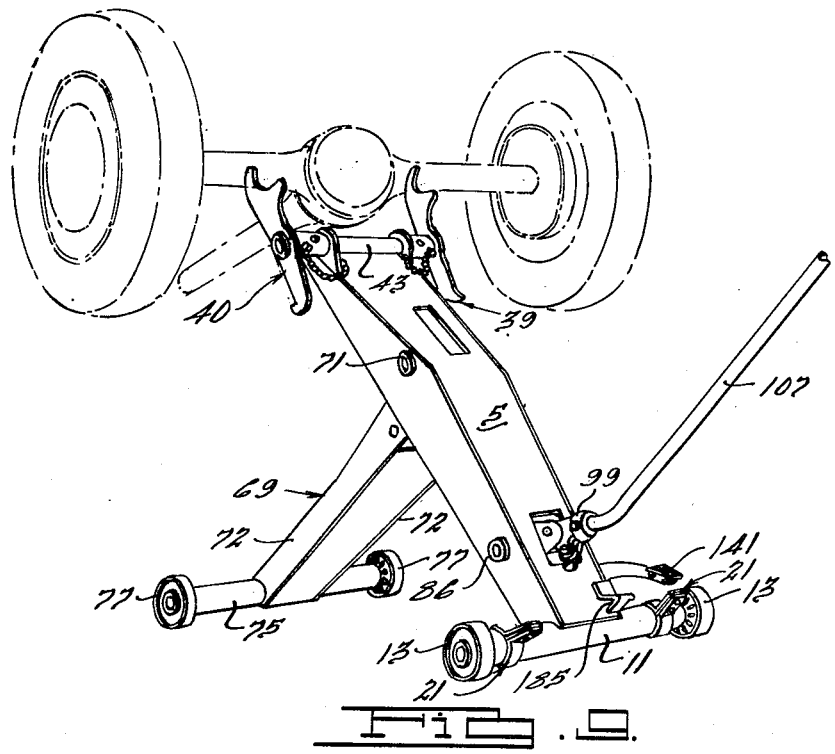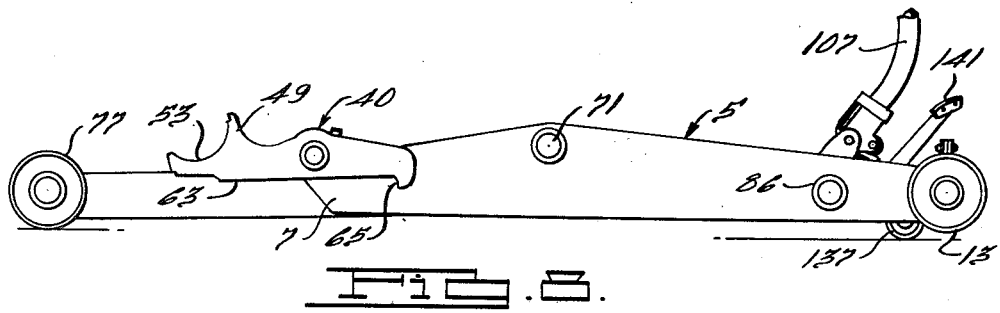

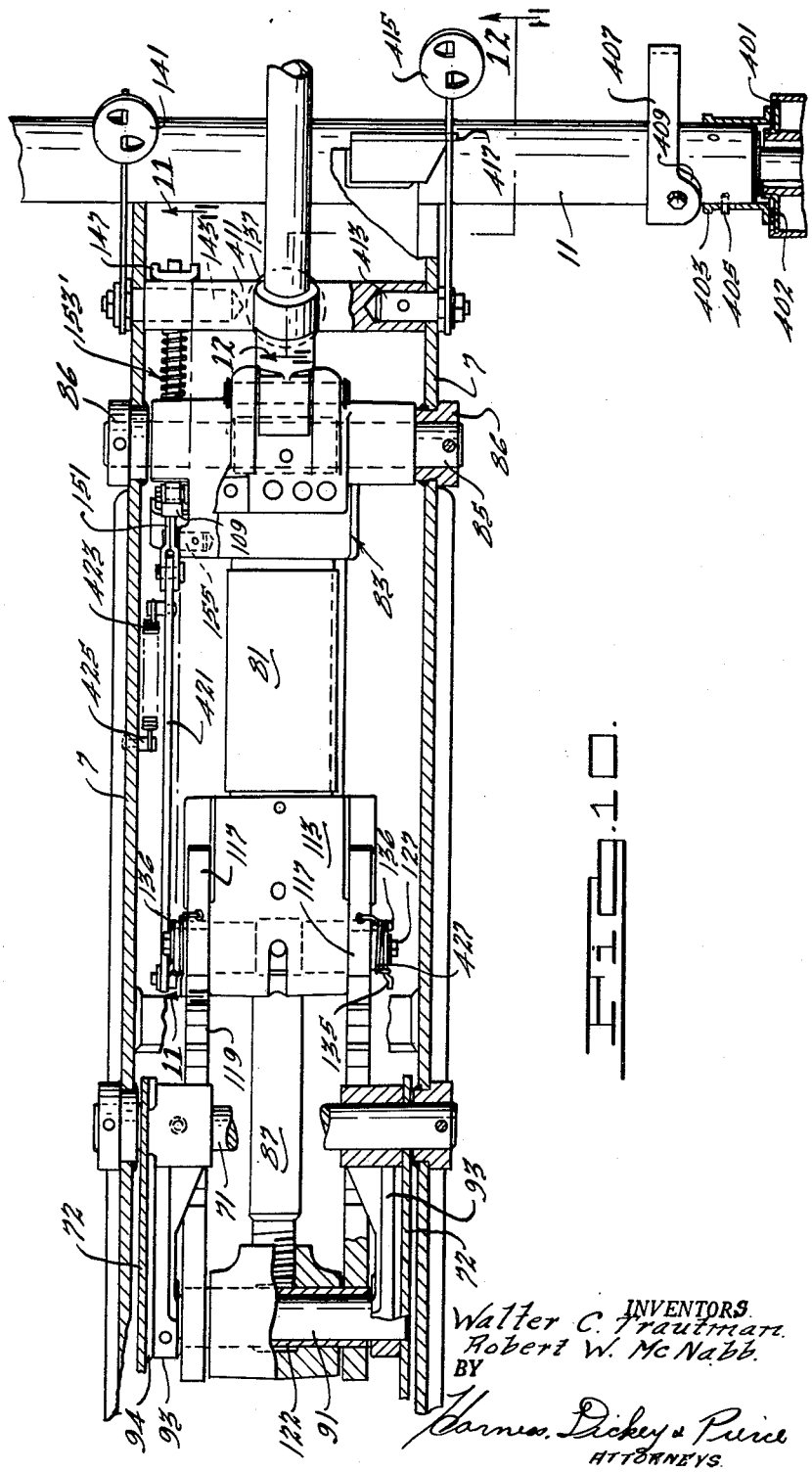

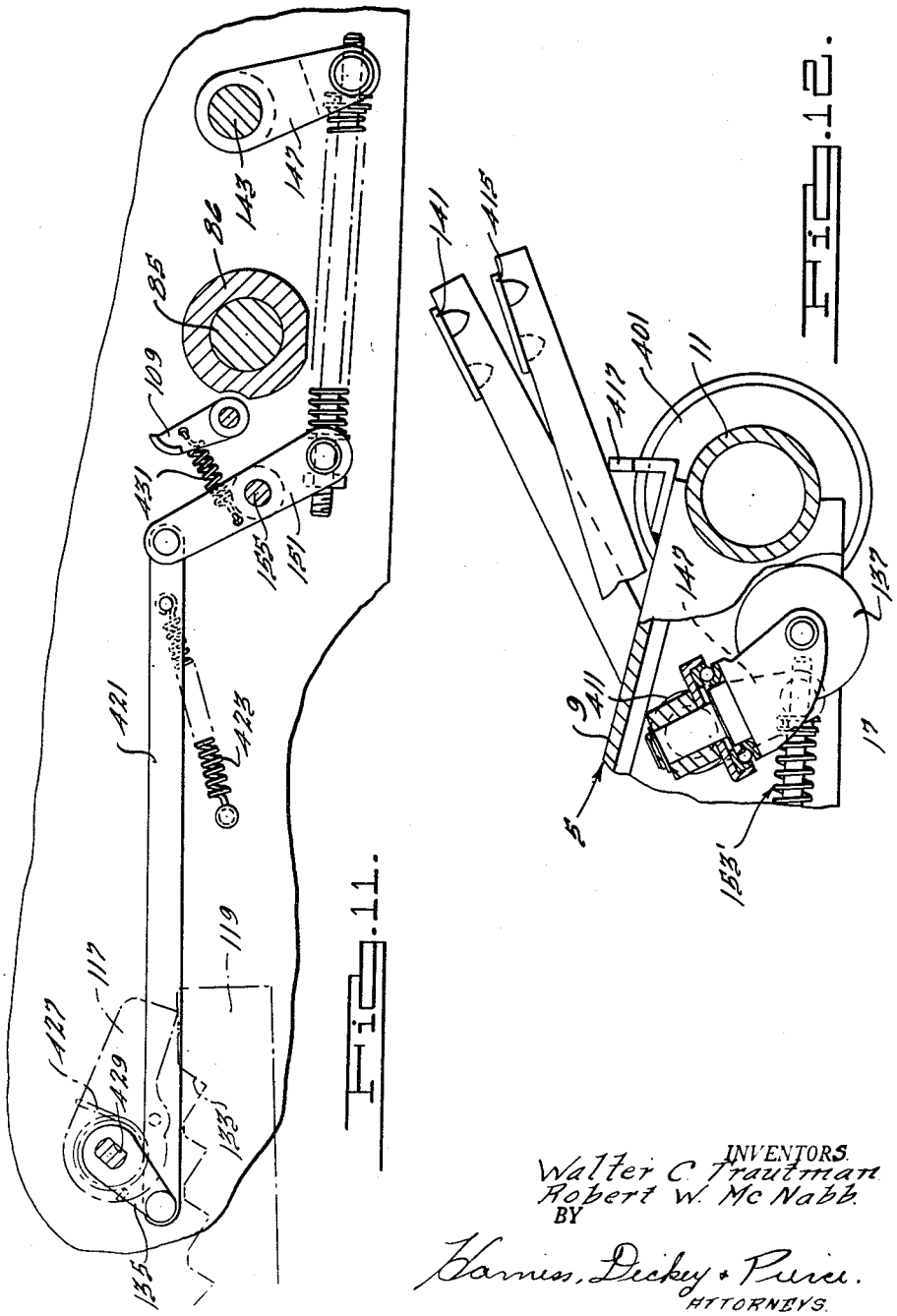

ONE END LIFT

Walter C. Trautman and Robert W. McNabb, Racine, Wis., assignors to Walker Manufacturing Company of Wisconsin, Racine, Wis., a corporation of Wisconsin Application April 13, 1951, Serial No. 220,872

16 Claims. (Cl. 254—8)

This invention relates to portable lifting devices and, in particular, to the mobile type of lifting unit that is especially useful around garages and repair shops where it is desired to lift heavy loads quickly, easily, and safely. An important use of the invention is in lifting one end of an automobile to a height such that repair work can be easily done underneath by a mechanic in a kneeling or sitting position.

In its preferred form, the lifting unit of the invention has two primary structural members that have a jackknife relationship to each other. Thus, one of the members is a top beam that preferably carries wheels at one end and is adapted to engage an automobile or other object at its other end. The other member is a lower beam which is hinged to the top beam at one of its ends and which preferably carries wheels at its other end. The hinge connection between the members is preferably located intermediate the ends of the top member to give added stroke to the lift, though at all elevations the line of force of the load falls between the wheel carrying ends of the members so that stability is always maintained. Thus, the top beam acts, in effect, as a lifting boom and preferably carries a pair of adjustable arms located on opposite sides of the center line of the lift which securely engage the work and avoid the possibility of eccentric loading. Suitable means, preferably a hand pump actuated hydraulic cylinder and ram assembly operating in tension, acts between the members to draw them toward each other, thus pivoting each upwardly about its wheel carrying end. In the preferred form, this means is connected to the members so that its leverage increases with the amount of lift. In the preferred arrangement wherein the hydraulic assembly is employed to elevate the members, both hydraulic and mechanical safety lock devices are used to prevent untimely collapse of the lift, these devices being unlocked in sequence by movement of a foot pedal. Locking means are also contemplated for the wheels at one end of the lift, preferably on the upper beam, so that "walking" of the unit during elevation or lowering can be avoided. While the device of this invention can lift very high, it nevertheless has an extremely low collapsed height since the lower beam and the operating mechanism fit inside of the upper beam. A caster wheel is provided to substitute for a pair of wheels at one end so that the lift can be more readily moved about, such movement of the unit as a carriage being conveniently energized by pushing or pulling the pump handle.

The foregoing and other features and advantages of the invention are described in connection with the following drawings which have been selected to illustrate the principles of the invention:

Fig. 1 is a plan view of a preferred embodiment of the invention;

Fig. 2 is a longitudinal section taken on line 2—2 of Fig. 1 showing the lift in elevated position;

Fig. 3 is a plan view of the operating mechanism with parts removed and other parts broken away;

Fig. 4 is a section taken on line 4—4 of Fig. 3;

Fig. 5 is a section taken on line 5—5 of Fig. 1;

Fig. 6 is a section through the hydraulic assembly taken on line 6—6 of Fig. 3;

Fig. 7 is a section taken on line 7—7 of Fig. 6;

Fig. 8 is a side view of the lift in collapsed condition;

Fig. 9 is a perspective view of the lift in elevated condition supporting the rear end of an automobile;

Fig. 10 is a plan view, similar to Fig. 3, of a modified form of the invention;

Fig. 11 is a section taken on line 11—11 of Fig. 10; and

Fig. 12 is a section taken on line 12—12 of Fig. 10.

As shown best in Figs. 1 and 2, the lift has a top frame or boom member 5 which includes vertical side plates 7 that are integral with a lateral web 9 and which serves as a primary structural element as well as a housing to conceal most of the operating mechanism. The V shaped gusset 10 is welded to plates 7 and 9 imparts torsional stiffness to the boom. An axle 11 is rigidly secured to the rear end of the frame 5 and may be tubular in construction as shown. The axle 11 extends laterally and horizontally a substantial distance beyond each of the plates 7 and journaled on roller bearings 12 in each end thereof is a wheel 13 whereby the frame 5 is rendered mobile.

In accordance with the invention, means are provided to lock the wheels 13 against rotation. This may be accomplished in various ways a simple and preferred method being best illustrated in Fig. 5. As there shown, the wheels 13 have inside radial faces 15 that are provided with a series of radially extending, angularly spaced recesses 17. The recesses on each wheel receive a nose 19 that is clamped between the side elements 20 of bifurcated lever 21 that is pivoted on axis 23 to opposite sides of the axle 11. One of the side elements of each lever 21 has a projection 25 extending at an angle thereto and provided with an aperture 27 in which one end of a U-shaped spring wire 29 is received. The bight of the U-shaped wire rests against a pin 31 fixed in the axle 11 and the other end of the wire is fixed to the axle by screw 33. It is clear from Fig. 5, that as a lever 21 rocks on its axis 23 towards a wheel 13, the nose 19 enters a recess 17 to lock the wheel against rotation. When a lever 21 is rocked away from its wheel 13, the nose 19 is withdrawn and the wheel is free to rotate on its bearing in the end of the axle. The aperture 27 and spring 29 are located so that the line of spring force applied to the projection 25 passes over center as the lever 21 is rocked between its two extreme positions. The springs 29 therefore serve to yieldably hold the levers 21 in either the engaged or disengaged positions. As indicated in Fig. 5, the inside of the tubular axle 11 may be reinforced at the lever axis 23 by a plug 35 held in place by radial pin 37.

As is apparent from Fig. 2, the frame 5 is elevated by upward pivoting about its rear end. The forward end of the frame 5 carries means for engaging the object to be lifted, left- and right-hand fixtures 39 and 40 adapted to engage the underside of an automobile being illustrated in Figs. 1 and 2. Each of these fixtures includes a hollow hub 41 that is mounted on the ends of a lateral and horizontal cross bar or tube 43 which is rigidly secured to the forward end of the frame 5, preferably with its axis located above the surface of web 9. Each hub 41 has rigidly secured to it, as by welding at 45, an arm 47 that may be formed of heavy steel plate and which extends parallel to the side plates 7. Each arm 47 has a section 49 that extends on one side of the hub 41 and another section 51 that is on the other side of the hub, the sections 49 and 51 preferably being laterally offset so that section 49 lies outwardly of section 51. Sections 49 are provided with approximately semi-circular cutouts 53 that face forwardly and upwardly when the arms 47 are level. The cutouts are capable of cradling front and rear automobile axles. The hubs 41 can pivot on the ends of the cross bar 43 to various angular positions, as shown in Fig. 2, so that the cutouts 53 face upwardly and over the range from forwardly to rearwardly. Each hub 41 may be held in position by a pin 55 that extends radially through aligned apertures 57 and 59 in the walls of the hub and cross bar 43, it being recognized that by providing both the hub and the cross with a number of angularly spaced holes for the pin 55 a wide variety of positions may be obtained. To prevent loss the pins 55 may be permanently secured to the frame 5 by chains 61. The fixtures 39 and 40 are also adapted to engage the underside of knee action front end suspensions. For this type of use, they are turned over so that the cutouts 53 are underneath and the relatively straight edges 63 are uppermost. The front end suspension then rests on edges 63 and weight is distributed on both sides of the cross bar 43 so that it is not necessary to use pins 55 to hold the fixtures in position. The edges 63 may be provided with ledges 65 at the forward end to prevent elements of the automobile suspension from sliding off the edges.

As already described, the front end of the upper channel or frame 5 is the lifting end and, subject to an exception hereafter noted, it pivots about the wheels 13 mounted at its rear end. The frame 5 is braced and supported by a lower, front channel or lifting leg 69 that is hinged at its rear end on trunnions 71 to a central portion of the frame 5. The front leg 69 is preferably of a construction similar to that of the frame 5 and has side plates 72 rigidly joined by a top and bottom webs 73. An axle 75, the same as axle 11, is rigidly secured by welding or other suitable means to the front end of the leg 69. The ends of the axle 75 extend outwardly substantial distances beyond the side plates 71, and rotatably carry wheels 77, which for the sake of manufacturing simplicity are identical to wheels 13. Inasmuch as wheel locks are more conveniently used at the rear end of the lift, i. e., on wheels 13, there need be no locks provided for wheels 77, it being appreciated, however, that it is within the purview of the invention to reverse the wheel locking arrangements, if desired, or to provide locks for all the wheels.

The rear portion of front channel 69 fits inside of the frame 5 when the lift is collapsed and in order to elevate the member 5 means are provided to act between the channel 69 and the member 5 to draw their respective front and rear ends (mounted on wheels 77 and 13) toward each other. Such movement is accommodated by pivoting of the channel or leg 69 on trunnions 71. The movement is actuated by suitable means, preferably a hydraulic cylinder and ram assembly 81.

The hydraulic assembly 81 has a cylinder 82 with a valve block 83 at its rear end. The block 83 has a transverse aperture 84 through it to receive trunnion shaft 85 that is mounted by retainers 86 on the side plates 7 and thus pivotally supports the assembly 81 on the rear end of the frame member 5. The assembly 81 has a ram 87 that slides in the cylinder 82. The ram is provided at its front end with a trunnion block 89 that pivotally receives the trunnion shaft 91 which is mounted on the side plates 72 and which therefore pivotally mounts the assembly 81 on the front leg 69. The trunnion shaft 91 is located below and forwardly of the trunnions 71 so that the leverage applied by the assembly 81 increases with the amount of lift. It will be observed that in the preferred arrangement shown the pivots 85 and 91 are located unequal distances from the hinge 71 and that in the fully elevated position these three points define the corners of a substantially right angle triangle with the hypotenuse located between the hinge 71 and one of the pivots, or, in other words, the line of force of assembly 81 being an altitude. For the purpose of structural reinforcement, side arms 93 may be welded at 94 or otherwise rigidly affixed, to the side plates 72 and provided at opposite ends with bores to receive the trunnions.

The valve block 83 carries a pump 95 and adjacent the pump it has the upstanding lugs 97. A pump handle socket block 99 fits between the lugs 97 and is pivoted to them by means of the transverse pin 101. The socket block has a roller 103 to engage the pump piston and a suitable socket 105 to removably receive the pump handle 107 which, it will be seen, can be rotated forwardly to lie flat on the top of web 9. As will be described more fully hereinafter, the operation of the assembly 81 is such that actuation of the pump 95 causes the ram 87 to move into the cylinder 82 or toward the rear of the lift, this, of course, pulling the axles 11 and 77 toward each other to elevate member 5 and fixtures 39 and 40. Working pressure on the ram 87 is released to permit it to move out of the cylinder 82 and descent of the lift by rearward movement of a release valve lever 109 that is mounted on the valve block 83 against the resistance of a spring 111 that is connected to it and anchored at its forward end to the ram end block 113 of the cylinder 82 as shown at 115.

While the pressure in the hydraulic system is sufficient to hold the member 5 in elevated position under load, there is always a possibility of its failure or leakage as well as a possibility that the release valve might be inadvertently tripped either of which might result in serious consequences due to lowering of the lift. In order to prevent this, a safety device is provided and this is preferably arranged so that it must be overcome prior to operation of the release valve controlled by lever 109.

A preferred form of safety device is shown in Figs. 2–4 and resides in the use of dogs or pawls 117 and rack bars 119. The rack bars 119 move with the ram 87 and have apertures 121 at their forward ends by means of which they are mounted by way of a bushing 122 on the trunnion 91 on either side of the ram trunnion block 89. Guide blocks 123 are secured to the sides of the ram end block 113 to slidably connect them to the cylinder in desired alignment with the pawls 117.

The pawls 117 are secured on either side of the block 113 by radial pins 125 to a transverse rock shaft 127 which pivots in an aperture 129 in the ram end block 113. A coil spring 131 is anchored at one end to one of the pawls 117 and at its other end to a guide block 123 and serves to yieldably drive the pawls toward the rack bars 119. The pawls 117 face rearwardly and when fitted in teeth 133 in the bars 119 prevent the ram 87 from moving out of the cylinder 82 even though pressure conditions in the assembly 81 may permit such movement. A crank arm 135 is mounted on one end of the rock shaft 127 and by abutment with pin 136 extending transversely from a pawl serves as means to pivot the shaft and lift the pawls 117 out of the teeth 133. When this is done, the ram 87 may move out of the cylinder 82 and the members 5 and 69 can pivot relative to each other on shaft 71 until the lift is collapsed.

It may be noted here that in fully collapsed condition, the lift rides on front wheels 77 and on a single rear caster 137 of a conventional type that swivels in its housing 139 which is rigidly secured to the underside of web 9 forwardly of the axle 11. Thus, in fully collapsed condition the rear wheels 13 are off the ground and its maneuverability is enhanced by use of the caster 137. It will now be recognized that when the assembly 81 is actuated to raise the lift, the member 5 will first pivot about the caster 137. This will lower wheels 13 to the ground and further elevation will shift the pivot axis to the axis of rotation of the wheels 13, the reverse procedure occurring when the lift is lowered.

Lowering of the lift from elevated position is actuated by a control member, namely, depression of the foot pedal 141 which is secured to transverse shaft 143 that is pivotally mounted in a suitable bearing 145 on side plate 7. A crank arm 147 is secured to shaft 143, inside of the member 5, by a radial pin 149 and its lower end rotates forwardly when the pedal 141 is depressed. The lower end of the arm 147 drives the lever 151 through an adjustable link assembly 153 which will be described hereinafter. The lever 151 is centrally pivoted by pin 155 to a side of valve block 83 and is connected to assembly 153 at its bifurcated lower end so that depression of foot pedal 141 moves the top of the lever toward the rear (to the left in Fig. 4). Such rearward movement of lever 151 is yieldably resisted by a spring 157 that is connected to a pin 159 extending across the bifurcated top of lever 151. The forward end of spring 157 is anchored at 161 to a guide block 123 and the spring is preloaded so that it serves to force the foot lever 141 to its upper, released position.

Movement of the lever 151 toward the rear when pedal 141 is depressed first lifts the pawls 117 out of the teeth 133 in the rack bar 119 and then forces release valve lever 109 to the rear to let the ram 87 move out of the cylinder 82. The lever 151 is connected to the pawls through a spring 163 that hooks on the pin 159 and on the bottom of pawl crank 135 as shown at 165. The spring 163 is preloaded and overrides spring 131 but, its tendency to rotate the pawls 117 out of the teeth 133 is resisted by spring 157 as well as spring 131.

The initial tension in spring 163 plus its heavy coils permit it to act as a solid tension link so long as the forces required to remove the dogs 117 are low. Then, depression of foot pedal 141 and rearward pivoting of lever 151 will result in the rotation of the pawls 117 out of the teeth 133. However, if the hydraulic system fails with a load on the lift, the dogs 117 transmit the load to the teeth 133 and the forces required to rotate them out of the teeth are therefore very high. Under this condition depression of foot pedal 141 will simply be absorbed by the spring 163 and it will not be possible to remove the pawls 117 from the teeth 133 until the load in the lift is removed. Likewise, excessive force applied to the pedal 141 will not result in breakage of some parts of the mechanism as would be the case if 163 were a solid bar.

Continued depression of pedal 141 moves the lever 151 rearwardly until it strikes release valve lever 109, this engagement being delayed until the pawls are fully out of ratchet engagement with the teeth 133. Further movement of pedal 141, and thus lever 151, forces the lever 109 rearwardly and, as will hereinafter appear, allows pressure on the ram 87 to be relieved at a rate proportional to the movement of lever 109. The lift therefore is collapsed at a controlled rate by its own weight or by that of a load upon it. It will be obvious that suitable limit stops may be provided, if necessary, to prevent the pawls 117 from rotating to such an extent that spring 131 passes over center.

It is evident that in connecting the shaft 143 to the lever 151, the link assembly 153 joins units (member 5 and hydraulic assembly 81) having different types of movement during elevation and descent of the lift. The frame 5 pivots about caster 137 and about wheels 13 and so does the hydraulic assembly 81, but the assembly 81 also pivots on trunnion 85 relative to the member 5. Thus, the lever 151 is subject to movement that shortens or lengthens its distance from the arm 147. With the construction illustrated the lever 151 is a maximum distance from the arm 147 when the lift is fully collapsed so that elevation of the lift is accompanied by shortening of the distance. The link assembly 153 includes a rod 167 that is pivoted to the bifurcated lower end of lever 151 on a transverse pin 169. The rear end of the rod 167 slidably extends through a transverse pivot pin 171 mounted on the bifurcated lower end of crank arm 147. A sleeve 173 and locking units 175 are threaded on the end of the rod 167 and bear against the rear side of pin 171 when the lift is collapsed. It will be seen that the control of the length of the rod 167 afforded by the nuts and sleeve 173 permits the angular position of lever 151 to be adjusted to regulate to its spacing from the release valve lever 109. During elevation of the lift, the shortening of the distance between lever 151 and arm 147 will result in a tendency for the sleeve 173 to move rearwardly out of contact with the pin 171. Movement of lever 151 or lost motion because of this shortening is prevented by a coil spring 179 that is mounted on the rod 167. The spring bears at its forward end against a radial shoulder 181 on the rod 167 and at its rear end against a sleeve 183 on the rod which it presses against the pin 171. Shortening of the distance between the lever 151 and arm 147 compresses the spring 179 which therefore prevents the lower end of the lever 151 from moving rearwardly. The spring 179 is stiff enough so that it transmits sufficient force when the pedal 141 is depressed to hold the release valve lever 109 in its rearmost position during collapse of the lift.

A stop bracket 185 is affixed to the rear end of web 9 to determine the limit of downward motion of pedal 141. Its upward motion is limited by abutment of lever 151 with an edge 186 of the valve block casting 83.

As already indicated, the hydraulic cylinder and ram assembly 81 is unusual in lift constructions in that its working stroke consists in moving the ram into the cylinder while in its non-used condition the ram extends as far out of the cylinder as possible. This use of the assembly enables the cylinder itself to be used as a reservoir for oil as shown best in Figs. 3 and 6–7.

The ram 87 has a piston 191 suitably affixed to its rear end and sliding in a bore 193 provided by the cylinder 82. The front and rear ends of the cylinder 82 are closed by the aforementioned ram end block 113 and valve block 83 which may be threaded on to the end portions thereof and provided with suitable sealing means to prevent leakage. On the working stroke, high pressure exists in the space between the ram block 113 and the front face of the piston 191. This is provided by the pump 95 which takes the fluid from a relatively small reservoir chamber 195 in the block 83 that is in open communication through the end of the block with the low pressure space in bore 193 behind piston 191. In flowing from reservoir 195 to the pump, oil flows through strainer 197 that is held in lateral passage 199 by a closure screw 201 threaded into block 83. Vertical passage 203 opens into and receives oil from passage 199. It is enlarged to provide valve seat 205 for ball check 207 that prevents oil from passage 203 into passage 199. Oil from the reservoir flowing upwardly in passage 203 is attracted by pump piston created suction in lateral and downward passage 209 and flows through it to the bottom of a bore 211 formed in block 83 to threadably receive pump cylinder 213.

The pump 95 has a plunger-piston 215, with suitable packing 217 at its working end, which is reciprocated in cylinder 213. A transverse pin 219 in the plunger 215 slides in slots 221 in the cylinder 213 which therefore limit the stroke of the plunger. The plunger 215 has a radial shoulder 223 against which a spring 225, surrounding cylinder 213, presses a tube or housing section 227. The tube 227 telescopes on another tube or housing section 229 that is pressed by spring 225, mounted therein, against radial shoulder 231 on the cylinder 213. It is clear that downward movement of the pump handle 107 on pivot 101 enables roller 103 to force the plunger 215 downward in cylinder 213 against the resistance of spring 225.

On the downward or pumping stroke of plunger 215, oil is forced from cylinder 213 through passage 209 to passage 203. Pressure in passage 203 seats ball check 207 so that oil cannot flow to the reservoir through passage 199. Oil can flow into passage 235 which opens into passage 203 between passage 209 and valve seat 205. Passage 235 is enlarged into passage 236 to provide a seat 237 for ball check 239 which is pressed by spring 241 via slidable spring cup 243 against the seat. The compression of spring 241 is regulated by the adjustment plug 245 that is threaded into the block. This arrangement constitutes an overload or safety valve and if pressure in line 203 exceeds the setting of spring 241, it unseats ball check 239 and oil flows by it into lateral passage 247 that opens into bore 193 back of the piston 191.

Oil under pressure from the pump 95 can also flow upward in passage 203 to force ball check 249 from its seat 251 formed by enlarging passage 203. It may be observed here that floating spacers 253 and 255 are put in passage 203 to keep the ball checks 207 and 249 in operative relationship to their respective valve seats. Passages 257 and 259 branch off from passage 203 which is closed at its top end by a plug 261 threaded into the block 83. Passage 257 leads the fluid to the front side of the piston whereas passage 259 leads into the release valve operated by lever 109 as will be described.

Passage 257 opens near the top of the block 83 into a horizontal, longitudinally extending passage 263. A conduit 265 is slidably received in passage 263, but sealed therein by O ring 267, and a spring 269, which backs up against plug 271 threaded into the block 83, presses on the end of the conduit 265 to urge it forwardly against a shoulder 273 formed in passage 275 in the ram end block 113, an O ring 277 or other suitable seal being provided in passage 275. Oil under pressure therefore flows from passage 257 into passage 263 and thence through conduit 265 to passage 275 in the ram end block 113. A radial passage 279 connects passage 275 with a longitudinal passage 281 opening into the rear face of the block 113 and thus behind the piston 191, the packing retainer 283 shown in the drawings having suitable openings for flow of fluid through it.

Back flow from conduit is prevented, of course, by ball check 249. However, when it is desired to lower the lift by releasing pressure on the forward side of the piston 191, the release valve lever 109 can be rocked in a manner already described to connect the conduit to the rear side of the piston in a manner now to be described. Rearward movement of the lever 109 pivots the valve stem 285 on which it is mounted at 287. The valve stem is threaded into the block 83 as shown at 289 so that such pivotal motion causes it to also move axially. As a result, the valve 291 is moved away from its seat 293 in passage 259 by an amount proportional to the degree of pivotal motion. This permits oil to flow through passage 259 into the enlarged passage 295 containing the valve stem 285 and thence into passage 297 which opens out of the end of the block 83 behind the piston 191. The rate at which oil will flow by the valve end 291 depends, of course, on its spacing from the valve seat 293 and hence on the angle to which the lever 109 has been turned.

Oil is added to the cylinder 82 and reservoir 195 through a vertical passage 299 that opens into the reservoir 195 and communicates with a passage 301 that opens into the front end of the block 83 behind the piston 191.

The operation of the lift has been indicated above in connection with each of the features of construction. From the foregoing description, it will be seen that in collapsed condition the member 5 rests on caster 137 and the front channel 69 on wheels 77. The hydraulic assembly 81 is extended to its full length so that ram piston 191 is at the front end of cylinder 82. The lift is elevated by pumping handle 107 to actuate pump plunger 215. This forces oil through passages 209, 203, 257, 263, conduit 265, 275, 279, and 281 to the front side of piston 191 and drives it rearwardly to shorten the assembly 81. Such shortening drops wheels 13 to the ground and moves wheels 13 and 77 toward each other as member 5 and channel 69 pivot toward each other on hinge 71. During this movement, the rack bars 119 move with the ram 87 and pass freely by the pawls 117.

Before elevation is begun, the fixtures 39 and 40 may be turned on cross bar 43 to the desired positions for engaging the object to be lifted. It will be noted that at all elevations the line of force of the load on the lift will pass between the front and rear axles so that the lift is stable. Actually, the line of load force approaches closer to the midpoint between the axles as the lift is elevated.

While the frame 5 is in elevated position pressure in the cylinder 82 is locked ahead of the piston 191 to prevent collapse. As a further precaution, the dogs 117 engage teeth 133 in rack bars 119 to prevent forward movement of the bars and thus the ram 87 to which they are connected by shaft 91.

Lowering of the lift is actuated by depression of pedal 141 which acts through link assembly 153 to pull the bottom of lever 151 rearward. This first allows spring 163 to pull crank arm 135 rearward and rotate the pawls 117 out of the teeth in the rack bars. When the pawls are clear, the lever 151 forces lever 109 in a rearward direction to unseat valve end 291. Oil in front of the piston 191 can then flow to the back of the piston 191 via passages 281, 279, conduit 265, 263, 257, 203, 259, 295, and 297 as the weight of the lift tends to force the wheels 77 and 13 apart.

During either lifting or lowering movement, the rear end of the lift may be maintained in stationary position by moving levers 21 outwardly to lock the wheels 13 against rotation.

A modified form of the invention is shown in Figs. 10-12 wherein parts essentially the same as these shown in Figs. 1-8 are referred to by the same reference numbers. The embodiment of Figs. 10-12 has a different form of lock for the rear wheels, the caster 137 is retractible, and a slightly different connection exists between the foot lever 141 and the pawls 117.

As best shown in Fig. 10, the rear wheels 401 (corresponding to wheels 13) have an annular brake lining 402 affixed to their inside radial face. A sleeve 403 slides on the axle 11 adjacent each wheel and has a radial flange engageable with the brake lining, the sleeve being fixed against rotation on the axle by suitable means such as a pin and slot connection 405. A U-shaped lever 407 has its legs pivoted on the axle 11 and a cam face 409 thereon engages the end of the sleeve 403 so that pivoting of the lever inwardly forces the sleeve flange against the lining 402 to lock the wheels.

In this embodiment of the invention, the foot pedal rock shaft 143 is journaled in the end of a cross shaft 411 which, in turn, receives and is supported upon a rock shaft 413 for caster pedal 415 which shaft pivotally extends through a side plate 7. The shaft 413 drives shaft 411 through radial pin 415, but it is clear that the shaft 413 merely pivots on rock shaft 143 without turning it. The caster 137 is suitably affixed to the cross shaft 411 along the center plane of the lift. This depression or elevation of pedal 415 will pivot shaft 411 to lower or raise caster 137. The pedal 415 may be held in depressed or elevated position by springing it under or over a catch 417 affixed to the axle 11.

The pedal arm 147 on rock shaft 143 drives the lever 151 through an adjustable link assembly 153' which is functionally similar to the assembly 153 described above. In this embodiment, the top of lever 151 is connected to the pawl crank arm 135 by a link bar 421 which is pivoted to the lever and pawl. A spring 423 anchors on pin 425 on side plate 7 and is connected to the bar 421 to urge it in a forward direction. It will be seen that this acts through lever 151 and assembly 153' to hold the pedal 141 in elevated position. In this embodiment, the pawls 117 are free to pivot on rock shaft 127 except for torsion springs 427 that are anchored in the pawls and yieldably connect them to crank arms 135 which, in this case, are non-rotatably affixed to each end of shaft 127 by virtue of non-circular opening 429. The torsion springs 427 urge the pawls to rotate downwardly into the rack bar teeth 133. When link 421 is pulled rearwardly due to depression of pedal 141, it rotates one arm 135 and thus shaft 127. The torsion springs 427 transmit some force to the pawls tending to urge them out of the teeth and positive drive is achieved when they strike transverse pins 136 so that the pawls are lifted from the rack bars 119. After this occurs, the lever 151 contacts the release valve lever 109 to drive it rearwardly relieving pressure on the ram 87. The lever 109 is held in closed position and at the same time spaced from lever 151 by a coil spring 431 acting between the two levers.

From the foregoing description, it will be evident that the invention provides a safe, sturdy, mobile lift that has an unusually long lifting stroke for its low starting height. Modifications can, of course, be made in the illustrative structures shown herein without departing from the spirit or scope of the invention.

What is claimed is:

1. In a portable lift, the combination of a downwardly facing channel providing an upper beam, a lower beam inside the upper and hinged at one end to the upper beam, axles with wheels secured to the outer ends of the beams to movably support them on the ground, and means acting between the beams to move said beams toward each other and thereby jackknife the beams, said last means comprising a hydraulic cylinder and ram unit wherein the ram is connected to one beam and the cylinder to the other and arranged so that the operating stroke occurs on shortening of the unit, the connection to the upper beam being adjacent its outer end and the connection to the lower beam being adjacent its hinged end, said unit being substantially completely housed inside said upper beam at all relative positions of the beams.

2. The invention set forth in claim 1 wherein the connections of said unit to the beams are arranged so that the leverage of said unit about said hinge increases with the amount of lift and the lines of centers between said hinge and the points of connection of the ram and cylinder to the beams define a triangle in which the side defined by line of centers between said points is the longest side when the lift is in collapsed condition but shortens during lift and is substantially an altitude of the triangle when the lift reaches maximum elevation.

3. In a portable lift, the combination of an upper beam, a lower beam hinged at one end to the upper beam, means for supporting the outer ends of the beams on the ground, means acting between the beams to move said outer beams toward each other and thereby jackknife the beams, said last means comprising a hydraulic cylinder and ram unit wherein the ram is connected to one beam and the cylinder to the other, said unit including a pressure release valve, a pawl and ratchet bar assembly mounted on said cylinder and ram to prevent collapse of the lift, and common means for releasing said pawl from the bar and then operating said release valve to permit collapse of the lift.

4. In a portable lift, the combination of an upper beam, a lower beam hinged at one end to the upper beam, means for supporting the outer ends of the beams on the ground, means acting between the beams to move said outer beams toward each other and thereby jackknife the beams, said last means comprising a hydraulic cylinder and ram unit wherein the ram is connected to one beam and the cylinder to the other at points between said hinge and the respective outer ends of the beams, a ratchet bar connected to the ram and movable therewith, a pawl connected to the cylinder and engageable with the bar to prevent movement of the ram out of the cylinder, spring means urging the pawl into engagement with the bar, a control member for actuating collapse of the lift, link means operatively connecting the control member to the pawl whereby motion of the member disconnects the pawl from the bar.

5. The invention set forth in claim 4 wherein said hydraulic unit includes a pressure release valve lever and said link means operatively engages said lever only after the pawl is disconnected from the bar.

6. The invention set forth in claim 4 wherein said member is mounted on one of the beams and said link means includes a section yieldably variable in length to accommodate relative motion between the beam and unit.

7. The invention set forth in claim 4 wherein said link means includes a link to hold the pawl out of engagement with the bar.

8. The invention set forth in claim 4 wherein said link means includes a spring to hold the pawl out of engagement with the bar, said spring exerting greater force on the pawl than said spring means, and resilient means urging the member to inoperative position and acting in opposition to said spring whereby the spring is prevented from disconnecting the pawl until the member is actuated.

9. In a portable lift having an elevating beam, the combination of a cross bar mounted on the beam and extending beyond the sides thereof, and fixtures pivotally mounted on the ends of said cross bar and adapted to engage an object to be lifted, said fixtures comprising hollow hubs slidably and pivotally mounted on the ends of said cross bar and side plates rigid with the hub and normal to the axis of the bar, said hub and bar having alignable holes therein where pins may be placed to fix the angular positions of the fixtures on the cross bar.

10. The invention set forth in claim 9 wherein said side plates extend on either side of said hub and each has a substantially straight edge on one side and an arcuate cutout in the edge on the other side, said cutout being located on one side of the axis of the hub.

11. In a portable lift, the combination of a top beam, a bottom beam fitting inside the top, a hinge connection between one end of the bottom beam and an intermediate portion of the top beam, axles at the outer ends of said beams, wheels mounted on the axles and spaced substantially outwardly from the sides of the beams, means on the inner end of the top beam for engaging a load to be lifted, said means being located between said axles, and means acting between the beams to move said axles toward each other, said load engaging means comprising a cross bar secured to said beam, and load contacting fixtures pivotally mounted on each end of the cross bar and adjustable to various angular positions about the axis of the bar, locking means for holding the fixtures in adjusted angular positions, said fixtures being located inside of the wheels and on opposite sides of the center line of the lift.

12. In a lifting mechanism having a work engaging surface, the combination of a pair of members movable relative to each other to raise or lower the work engaging surface, fluid pressure means acting between the members to supply force for moving them relative to each other, said means including a pressure release element for rendering the means inoperative, ratchet structure acting between the members to prevent relative movement thereof so as to lower the lift, and force applying means acting through a spring for applying force to the ratchet structure to render it inoperative, said spring yielding to absorb such force in the event there is a load on the ratchet structure.

13. In a portable lift, the combination of a boom, the top end of the boom being adapted to engage an object to be lifted, a leg beneath the boom and hinged to an intermediate point on the length of the boom, axles on the lower ends of the leg and boom and extending a substantial distance outwardly from the sides of the leg and boom, wheels on the ends of said axles, a variable length force applying unit pivoted at one end to the boom and at the other end to the leg and substantially completely housed within the channel shape of the boom, and a single caster wheel device secured to said boom at a point spaced inwardly of the boom axle and of greater height than the boom wheels so that upon collapse of the lift said wheels may be lifted from the ground and the boom may ride on said caster device.

14. In a portable lift, the combination of a boom, the top end of the boom being adapted to engage an object to be lifted, a leg beneath the boom and hinged to an intermediate point on the length of the boom, axles on the lower ends of the leg and boom and extending a substantial distance outwardly from the sides of the leg and boom, wheels on the ends of said axles, a variable length force applying unit pivoted at one end to the boom and at the other end to the leg and substantially completely housed within the channel shape of the boom, braking surfaces on the boom wheels, and non-rotatable brake operator members movably mounted on the boom axle and operatively engageable with said surfaces to prevent rotation of said wheels.

15. The invention set forth in claim 14 wherein said braking surfaces are provided by radial slots in the inside faces of said wheels and spaced angularly about the axis of the wheels, said operator members being pivoted on the axle and having noses fitting in said recesses, and over-center spring means acting between the operator members and the axle to yieldably hold the members in engaged or disengaged positions.

16. In combination with the invention as set forth in claim 12, said force applying means including a manually operated lever, said spring acting as a link between said lever and said ratchet structure, said pressure release element being operated by said lever after predetermined angular movement of said lever.

References Cited in the file of this patent

UNITED STATES PATENTS

| Number | Name | Date |
|---|---|---|
| 1,945,910 | Nilson | Feb. 6, 1934 |
| 1,956,797 | Jackson et al. | May 1, 1934 |
| 2,189,010 | Lewis | Feb. 6, 1940 |
| 2,233,745 | Nilson | Mar. 4, 1941 |
| 2,400,316 | Page | May 14, 1946 |
| 2,458,407 | Nieterhauser | Jan. 4, 1949 |

FOREIGN PATENTS

| Number | Country | Date |
|---|---|---|
| 342,093 | Great Britain | Jan. 29, 1931 |
| 633,904 | Germany | Aug. 13, 1938 |
| 727,807 | France | June 24, 1937 |